United States Patent [19]

Gaiser

[11] Patent Number: 4,738,595

[45] Date of Patent: Apr. 19, 1988

[54] HYDRAULIC PUMP WITH INTEGRATED SUMP AND ACCUMULATOR

[75] Inventor: Robert F. Gaiser, Stevensville, Mich.

[73] Assignee: Allied Corporation, Morristown, N.J.

[21] Appl. No.: 54,171

[22] Filed: May 22, 1987

[51] Int. Cl.$^4$ .................................. F04B 49/02
[52] U.S. Cl. ...................... 417/36; 417/44; 417/307
[58] Field of Search ............ 417/36, 44, 307, 540, 417/571; 60/415, 418

[56] References Cited

U.S. PATENT DOCUMENTS

| | | | |
|---|---|---|---|
| 2,802,424 | 8/1957 | Lee | 417/540 |
| 3,143,969 | 8/1964 | Eames et al. | 417/540 |
| 3,270,634 | 9/1966 | Pasquali | 417/571 |
| 3,716,306 | 2/1973 | Martin | 417/44 |
| 3,724,972 | 4/1973 | Guetersloh | 417/307 |
| 3,832,095 | 8/1974 | Akima | 417/307 |
| 3,834,162 | 9/1974 | Keady | 60/418 |
| 4,371,317 | 2/1983 | Heibel | 417/307 |

FOREIGN PATENT DOCUMENTS

| | | | |
|---|---|---|---|
| 649073 | 10/1931 | Fed. Rep. of Germany | 417/307 |
| 1229243 | 9/1960 | France | 417/307 |

Primary Examiner—William L. Freeh
Attorney, Agent, or Firm—Ken C. Decker

[57] ABSTRACT

A hydraulic pump assembly includes a housing having a bore, and a sump piston, a pump piston and an accumulator piston received coaxially within the bore. The pistons respectively define a sump chamber, a pump chamber, and an accumulator chamber within the housing. A motor reciprocates the pump piston to pump fluid fron the sump chamber into the accumulator chamber.

12 Claims, 1 Drawing Sheet

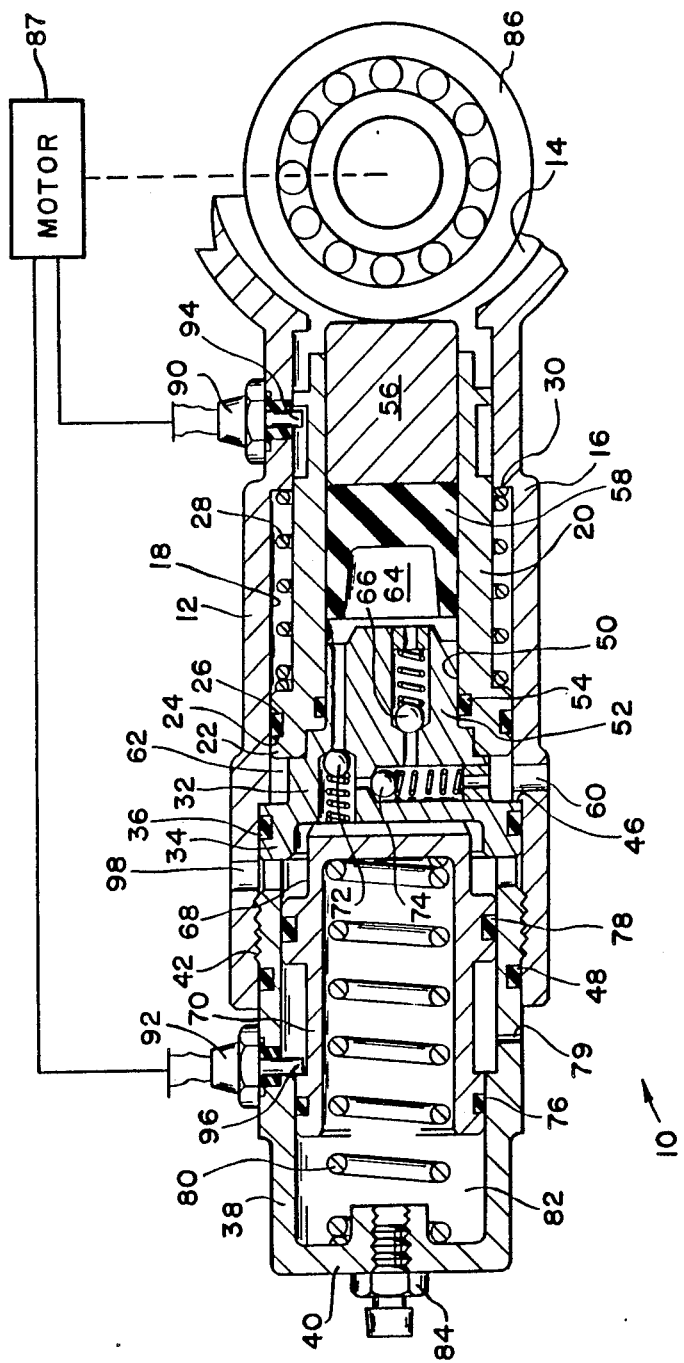

HYDRAULIC PUMP WITH INTEGRATED SUMP AND ACCUMULATOR

BACKGROUND OF THE INVENTION

The present invention relates to hydraulic pumps and in particular to such a pump having an integral sump and accumulator and adapted for use in anti-lock braking systems.

A source of pressurized braking fluid is an essential element in contemporary anti-lock braking systems. In one type of anti-lock braking system, a motor driven pump provides a source of pressurized braking fluid to increase braking pressure during a brake pressure build cycle, this type of system commonly being referred to as a full power system. In other systems, commonly referred to as pump-back systems, pressurized braking fluid is produced by the vehicle's power boosted master cylinder and a motor driven pump is utilized to replenish fluid lost from the vehicle's hydraulic circuits during brake pressure reduction or decay cycles. In both types of systems, it has been the common practice to provide the motor driven pump, a sump, and an accumulator as separate components. Such an arrangement possesses all of the inherent disadvantages of additional hydraulic connections, increased component count, added space requirements, reduction in hydraulic system stiffness, and the like. There therefor exists a need to provide an improved hydraulic pump system particularly well adapted for use in anti-lock braking systems which reduces or obviates the disadvantages of utilizing separate components for the pump, sump, and accumulator. It will also be recognized that such a system is equally applicable to traction control systems, that is, systems in which the brakes are utilized to reduce wheel spin during acceleration.

Broadly, the present invention is an integrated motor driven hydraulic pump, sump, and accumulator assembly which incorporates a pump body having a bore therein, pump piston means, a sump piston means, and an accumulator piston means disposed in the bore, a wall member fixedly mounted in the bore, and arranged such that the wall member, pump piston means, sump piston means, and accumulator piston means define therebetween variable volume pump, sump, and accumulator chambers, respectively. Motor driven means are provided for reciprocating the piston to pump fluid from the sump to the accumulator and valve means are provided within the wall member for controlling the flow of hydraulic fluid from the sump to the pump and accumulator chambers.

In one embodiment of the invention, a closure means is provided for closing the open end of the bore, the accumulator piston means and the closure member defining therebetween a variable volume accumulator pre-charged chamber. Preferably, the sump piston is hollow and the pump piston is axially reciprocally received therein. Accumulator and sump piston position switches may also be provided in the pump body.

It is therefor an object of the invention to provide an improved hydraulic pump assembly for use in anti-lock and traction control systems.

It is another object of the invention to provide such a system axially received within a common body and, in conjunction with a wall member, defines variable volume pump, sump, and accumulator chambers.

Still another object of the invention is to provide such an assembly in which all of the valves required for controlling the flow of hydraulic fluid are provided within the wall member.

Yet another object of the invention is to provide such a pump system in which all hydraulic connections between sump, pump, and accumulator are provided internally of the assembly.

Another object of the invention is to provide such an assembly requiring fewer parts, fewer hydraulic connections, and in which all hydraulic connections are of minimal length.

Yet another object of the invention is to provide such a pump system well adapted for mass production at minimal cost.

BRIEF DESCRIPTION OF THE DRAWINGS

These and other objects and purposes of the invention will be best understood when viewed in conjunction with the appended drawing which is an axial sectional view of a pump assembly in accordance with the invention.

DESCRIPTION OF THE PREFERRED EMBODIMENT

Referring now to the drawing, there is shown a pump assembly indicated generally at 10. The assembly comprises a body 12, typically of cast steel or aluminum, and provided with a central cylindrical cavity 14 and at least one radially extending body portion 16 having a stepped diameter cylindrical bore 18 formed therein communicating with cavity 14.

A hollow cylindrical sleeve 20, which functions as a sump piston, is slidably received within the bore 18. Piston 20 has an external flange portion 22 in which is formed a circumferential recess 24 fitted with an "O" ring 26. A spring 28 is compressed between flange portion 22 and shoulder 30 of bore 18 to resiliently urge the piston 20 to the left (as viewed in the drawings).

A wall member 32 is fixedly mounted in the bore 18. Member 32 is provided with a flange portion 34. An "O" ring seal 36 forms a fluid tight seal between flange portion 34 and bore 18.

A hollow cylindrical closure member 38 having a closed end 40 is secured in the bore 18 by means of threads 42, closure member 38 maintaining wall member 34 in position against shoulder 46 of bore 18. A fluid tight seal between closure member 38 and bore 18 is provided by seal 48.

The internal cylindrical surface 50 of sump piston 20 slidably engages a cylindrical, rightwardly extending portion 52 of wall member 32, fluid tight sealing engagement being provided therebetween by seal 54. A cylindrical pump piston 56 is reciprocally received within a bore in the sump piston 20. A cup seal 58 moveable with the piston 56 is also received within the bore of sump piston 20.

A fluid inlet port 60 communicates through the wall of the body 12 with a sump chamber 62 defined between the sump piston 20 and wall member 32. Unidirectional fluid flow from the sump chamber 62 into a pump chamber 64 is provided through a resiliently seated ball valve 66. Fluid flow from the pump chamber 64 to an accumulator chamber 68 defined between an accumulator piston 70 and wall member 32, is provided by unidirectional ball valve 72. A pressure relief valve communicates between the outlet of ball valve 72 and the inlet to ball valve 66.

The accumulator piston 70 is reciprocal within the closure member 38 and is fluid tightly engaged therewith by means of seals 76, 78. An atmospheric vent 79 is provided to prevent pre-charge gas from entering the brake fluid in the event of a seal failure. Accumulator piston is maintained in a normally rightward (as viewed in the drawings) position by a spring 80. A compressed gas pre-charged is injected into pre-charge chamber 82 defined by the accumulator piston 70 and closure member 38 by means of valve 84. A conventional eccentric assembly 86 is driven by a motor 87. The eccentric assembly 86 engages the pump piston 56 to reciprocate same. A pair of switch contact assemblies 90 and 92 are fitted through the walls of body 12 and closure member 38, respectively. Assemblies 90,92 are provided with electrical contacts as at 94, 96, respectively. They contact the sump and accumulator pistons when the pistons are distal and proximal wall member 32, respectively.

Initially, the components of the pump assembly 10 will be as shown in the drawing. Low pressure hydraulic fluid enters the assembly 10 through a sump inlet port 60. This fluid will cause the sump piston 20 to move to the right against the force of the spring 28. When the sump has became full, sump piston 20 contacts electrical contact 94 energizing the pump motor (not shown) rotating the eccentric assemblies 86 to reciprocate pump piston 56 and cup seal 58. Piston 56 draws fluid from the sump chamber 62 into the pump chamber 64 from whence it is pumped under pressure through ball valve 72 into accumulator chamber. 68. This causes the accumulator piston 70 to move to the left (as viewed in the drawings). When the accumulator piston reaches the left most extremity of its movement, it contacts electrical contact 96 to deenergize the pump motor. Pressurized fluid is drawn from the pump assembly via outlet port 98. Excess fluid from the pump chamber 64 is bypassed from the ball valve assembly 72 through the pressure relief valve 74 to the sump chamber 62.

It will now be seen that the pump assembly of the present invention provides the sump, pressure pump, switching means, and accumulator in an integrated assembly. The assembly is exceptionally compact with the various elements cooperating to define the sump, pump, and accumulator chambers. The co-axial overlapping arrangement of the pump piston, sump piston, and accumulator piston provides an assembly that is uniquely compact and in which fluid communication between the various components is provided by a hydraulic connections of minimal dimension. The entire valve assembly required for operation of these units is contained within the single fixed wall member which can be readily assembled prior to installation of the wall member into the pump housing. The entire assembly is easily assembled or disassembled for service. A plurality of pump assemblies can be provided in a radial array for actuation by single motor driven eccentric assembly 86 to accommodate anti-lock or traction control systems having a plurality of channels each requiring its own pump, sump, and accumulator assem- blies. The entire assembly occupies a space substantially equal to that normally required for the pump assembly alone.

Although the present invention has been illustrated and described in connection with example embodiments, it will be understood that this is illustrative of the invention, and is by no means restrictive, thereof. It is reasonable to be expected that those skilled in the art can make numerous revisions and additions to the invention and it is intended that such revisions and additions will be included in the scope of the following claims as equivalents of the invention.

What I claim is:

1. A hydraulic pump assembly comprising: a pump body having a bore therein, a pump piston means, sump piston means, and an accumulator piston means received in said bore, a wall member fixedly mounted in said bore, said wall member and said pump, sump and accumulator piston means defining therebetween variable volume pump, sump, and accumulator chambers, respectively, means reciprocating said piston for pumping fluid from said pump to said accumulator chambers, and valve means for controlling the flow of hydraulic fluid to and from said pump, sump and accumulator chambers.

2. The assembly of claim 1 further including closure means for closing one end of said bore, said accumulator piston means and said closure means defining therebetween a variable volume accumulator pre-charge chamber.

3. The assembly of claim 2 wherein said sump piston means is hollow, said pump piston being actually reciprocally received therein.

4. The assembly of claim 3 wherein said valve means includes a unidirectional inlet valve connected to an inlet port for permitting the flow from said inlet port to said pump chamber and blocking the flow of fluid from said pump chamber to said inlet chamber, unidirectional outlet valve means connected between said pump chamber and said accumulator chamber for permitting the flow of fluid from said pump chamber to said accumulator chamber and blocking the flow of fluid from said accumulator chamber to said pump chamber.

5. The assembly of claim 4 further including a pressure relieve valve connected between the outlet of said outlet valve means and said sump chamber for permitting the flow of fluid from said outlet valve to said sump chamber in response to a predetermined minimum pressure thereof.

6. The assembly of claim 5 further including first spring means for resiliently maintaining said sump piston in a collapsed position and second spring means for resiliently maintaining said accumulator piston in a collapsed position.

7. The assembly of claim 6 wherein said reciprocating means includes a motor, and eccentric operatively connected between said motor and said pump piston means.

8. The assembly of claim 7 wherein said inlet means, outlet valve means, and pressure relieve valve means are mounted in said wall member.

9. The assembly of claim 7 further including first electrical switch means operatively connected to said sump piston and operable in response to movement thereof to said collapsed position.

10. The assembly of claim 9 further including an electrical accumulator switch operable in response to movement of said accumulator piston to said collapsed position.

11. The assembly of claim 10 wherein sump, pump, and accumulator pistons are disposed coaxial relationship.

12. A hydraulic pump assemble comprising a pump body defining a bore therewithin, a wall member dividing said bore into a pair of coaxial sections, an accumulator piston slidably mounted in one of said sections and cooperating with said wall member to define an accumulator chamber therebetween, means yieldably urging said accumulator piston toward said wall member, a sump piston slidably mounted in the other section of said bore coaxial with said accumulator piston, said sump piston cooperating with said wall member to define a sump chamber therebetween, means yieldably urging said sump piston toward said wall member, an inlet port communicating with said sump chamber, an outlet port communicating with said accumulator chamber, a pump piston slidably mounted coaxial with said accumulator piston and said sump piston and cooperating with the wall member to define a pump chamber between the pump piston and the wall member, first passage means in said wall member communicating said sump chamber with the pump chamber, first check valve means mounted in said wall member and controlling communication through the first passage means for permitting communication from the sump chamber to the pump chamber but preventing communication in the opposite direction, second passage means in said wall member for communicating said pump chamber with said accumulator chamber, second check valve means mounted in said wall member and controlling communication through the second passage means for permitting communication from the pump chamber to the accumulator chamber but preventing communication in the opposite direction, and means for reciprocating said pump piston toward and away from said wall member whereby upon movement of the pump piston away from the wall member hydraulic fluid is drawn from said sump chamber into said pump chamber and upon movement of the pump piston toward said wall member the pump piston forces hydraulic fluid into the accumulator chamber.

* * * * *